United States Patent [19]

Jülke

[11] 4,222,635
[45] Sep. 16, 1980

[54] METHOD AND APPARATUS FOR PRODUCING LIQUID CRYSTAL DISPLAYS, AND A LIQUID CRYSTAL DISPLAY PRODUCED THEREBY

[75] Inventor: Elias Jülke, Wettingen, Switzerland

[73] Assignee: BBC Brown, Boveri & Company, Limited, Baden, Switzerland

[21] Appl. No.: 868,697

[22] Filed: Jan. 11, 1978

[30] Foreign Application Priority Data

Jan. 28, 1977 [CH] Switzerland .................. 1058/77

[51] Int. Cl.² ............................................. G02F 1/13
[52] U.S. Cl. .................................. 350/320; 356/352;
350/343; 350/344; 156/272; 156/360
[58] Field of Search ................. 350/331, 343, 344, 69,
350/178, 320; 156/272, 360; 356/352

[56] References Cited
U.S. PATENT DOCUMENTS

| 3,871,746 | 3/1975 | Muto et al. ..................... 350/343 |
| 3,919,452 | 11/1975 | Ettre et al. ..................... 350/343 X |
| 3,994,568 | 11/1976 | King et al. ..................... 350/343 |
| 3,995,941 | 12/1976 | Nagahara et al. ................. 350/343 |

Primary Examiner—Edward S. Bauer
Attorney, Agent, or Firm—Oblon, Fisher, Spivak, McClelland & Maier

[57] ABSTRACT

A method and apparatus for producing a liquid crystal display (LCD) whereby the two planar cell wall elements of the LCD are separated by an adhesion web made of a preparation which is polymerized into a solid, transparent adhesive bonding by the application of actinic radiation. The two planar cell wall elements, one of which is provided with the web preparation are mounted in a device which guides the cells toward one another. Upon reaching a predetermined measured separation distance, the cells are exposed to a source of actinic radiation, thereby polymerizing the web preparation into a suitable adhesion bonding between the two planar display elements.

2 Claims, 4 Drawing Figures

METHOD AND APPARATUS FOR PRODUCING LIQUID CRYSTAL DISPLAYS, AND A LIQUID CRYSTAL DISPLAY PRODUCED THEREBY

BACKGROUND OF THE INVENTION

1. Field of the Invention

The invention relates to a method of producing cells for liquid crystal displays, which are known as LCD's, these cells being referred to hereinbelow as LC cells. The invention further relates to the cell produced by this method and to an apparatus for applying the method.

2. Description of the Prior Art

As is well known, most industrially produced LC cells are made with the aid of two planar cell wall elements, of which at least one is light-transmissive. The two elements, for example consisting of glass plates or thin glass sheets for the bottom plate and cover plate with transparent electrode or raster electrode layers, are joined together to form a planar cell cavity suitable for receiving the LC composition, for example by applying a suitable bonding medium (glass solder) to the edges of the plates and thereafter heating the suitably adjusted plates, so as to obtain a physically impervious and chemically resistant bond between the cell wall elements which are spaced apart in accordance with the desired thickness of the cell cavity, for example 10 $\mu$m.

Since the known glass solder requires bonding temperatures on the order of 500° C., distortion of the plates frequently occurs, that is to say the rate of rejection is high. Furthermore, these methods of production are not suitable when in the course of their production the cell wall elements have to be provided with boundary layers of organic material.

It has already been proposed to replace the glass solder used in the production of LC cells by organic adhesives, for example thermoplastic adhesives based on thermoplastic phenoxy resins (see German Offenlegungsschrift No. 2,443,386). The thermoplastic adhesive, in which modifiers, for example cross-linking agents, thixotropy agents, adhesion promoters, and the like are incorporated, are for example applied by screen printing to the desired adhesion points of the cell wall elements. After the elements have been joined together, the thermoplastic adhesive is melted at temperatures of about 120° C. and then solidified. Other organic adhesives have also been proposed for the production of LC cells, for example polyethylene—tetrafluoroethylene copolymers having melting temperatures of about 300° C. (reports of the Res. Lab., Asahi Glass Co., Ltd., volume 25, No. 2 (1975); pages 71–79), but require special pretreatment of the plates.

When organic adhesives are used, the spacing of the cell wall elements, that is to say the thickness of the cell cavity, is generally a problem, this probably being mainly caused by the difficulty of verifying changes of viscosity of organic adhesives at temperatures in the melting and hardening ranges. This problem can be solved only partially by using spacers, for example the admixing of glass pellets of defined diameter. When customary setting adhesives are used the additional difficulty arises that the curing of typical irreversibly setting compositions, that is to say compositions polymerisable irreversibly and with cross-linking, frequently occurs without a defined temperature threshold and accordingly takes place "slinkingly", which in turn can lead to undesirable inhomogeneity as the result of local variation of heat transmission.

From coating techniques numerous kinds of varnishes and printing inks are known which contain a constituent which can be irreversibly set by UV radiation and can be very rapidly or abruptly set by brief irradiation (see for example Farbe and Lack, 82, 10 (1976), pages 973–978, as well as 82, 5 (1976), pages 391–393; Modern Plastics Int., October 1976, pages 56–58; Materials Engineering, 5-76, pages 40–42 and 73–85, and also literature of the appropriate suppliers).

In connection with optical purposes, irreversibly setting systems of this kind have been proposed solely for the adhesive bonding of lenses; the use of photolacquers for the selective coating of glass plates for LC cells with a thermoplastic polymer formed on the plates by the action of light has been proposed in German Offenlegungsschrift No. 2,322,616.

SUMMARY OF THE INVENTION

Accordingly, one object of this invention is to provide a novel method for producing a LC cell without the use of high bonding temperatures to join the cell plates.

Another object is to provide a novel method for producing an LC cell wherein the thickness of the cell cavity is uniform throughout the LC cell.

Another object of this invention is to provide a novel method for producing an LC cell using actinic radiation for the adhesive bonding of cell wall elements.

Yet another object is to provide a novel method for producing an LC cell which is suitable for mass production.

Another object of this invention is to provide a novel apparatus for carrying out the method of the invention.

A further object is to provide a novel LC cell produced by the method and apparatus of the invention.

These and other objects of the present invention are achieved by using preparations which can be irreversibly set by actinic radiation, particularly UV light, for the adhesive bonding of cell wall elements of LC cells and initiating the setting of the preparation at least partly by exposure to actinic radiation. This promotes rapid setting (achievable for example within seconds or fractions of a second) without any substantial rise in temperature, the ability to use solvent-free mixtures, the ability to apply the preparation in a simple manner by screen printing, good adhesion to glass surfaces without special adhesion promoters, adequate pot life, and resistance to LC compositions.

A particularly important and unexpected advantage of the use of preparations which can be irreversibly set by actinic radiation for the production of LC cells consists in that it enables the hitherto not completely satisfactorily solved problem of the spacing of the cell wall elements, that is to say of the relatively critical thickness of the cell cavity, to be solved in a simple manner which is suitable for mass production.

According to a preferred embodiment of the process of the invention the cell wall elements with the irreversible setting preparation at the desired adhesion points are guided plane parallel against one another, for example by a relatively weak, but continuously acting pressure, until the continuously measured (e.g. optically) distance between the cell wall elements reaches a predetermined desired value. When this value is reached an automatically triggered signal exposes the preparation to actinic radiation, e.g. in the form of a light flash, and results in abrupt polymerization which imparts to the preparation a consistency (gelling or abrupt increase in viscosity) making impossible any further movement of the wall elements towards one another. If necessary, the cell preparation fixed in this manner can immediately thereafter or at a later time be completely cured, that is to say converted into an irreversibly set mass, by the further action of light and/or by the action of a moderate temperature.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
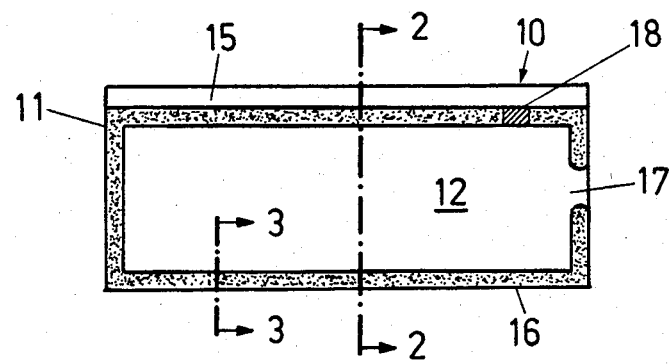
FIG. 1 is a diagrammatical top view of an adhesively bonded LC cell, such as can be obtained by the method of the invention.
Figure 2:
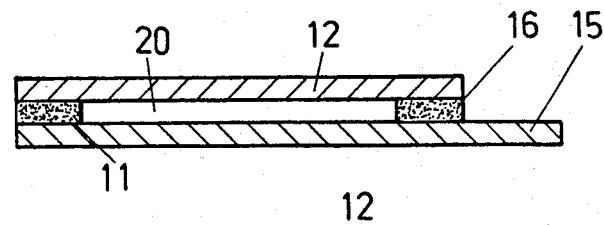
FIG. 2 is a section view on the line 2—2 in FIG. 1 on a larger scale.

Referring now to the drawings, wherein like reference numerals designate identical or corresponding parts throughout the several views, and more particularly to FIG. 1 thereof, the LC cell 10 is seen to consist of a base plate 11 having a projecting contact web 15, and is in addition covered by the cover plate 12. In the outer edge region of the mutually facing sides of the plates 11, 12 there is provided a cross-hatched adhesion web 16 which is interrupted only to form the filling aperture 17. As shown in FIG. 2, the planar cell cavity 20 is bounded by the plates 11, 12 and the adhesion web 16. The plates 11, 12 are provided in known manner, for example by vapour deposition, with transparent electrode or electrode raster coating (not shown) and with orientation coatings (also not shown in the drawings). For electrical connection of the electrode layer on the inner side of the cover plate 12 to the corresponding connection region on the contact bridge 15 the region 18, serving as bridge contact, of the adhesion web 16 is permeated with electrically conductive material, for example fine metal powder.

The plates 11, 12, which are generally made of thin mineral glass and which have electrode and orientation coatings, constitute the two planar cell wall elements, of which at least one is light-transmissive. Both cell wall elements are usually light-transmissive. The cell cavity 20, which lies between these wall elements and is enclosed laterally by the adhesion web 16 and which has a thickness corresponding to the distance between the wall elements, usually a very slight thickness of for example 10 μm, can be filled through the filling opening 17 with liquid crystal composition, whereupon the filling opening is closed.

For the purpose of applying the method of the invention, for the adhesive bonding of the cell wall elements, for example the plates 11, 12, use is made of a preparation which can be set by actinic radiation, for example one of the industrially available preparations which can be hardened by UV radiation and which is based on modified acrylic or epoxy resins or of unsaturated polyester resins. Among the numerous products, which are usually available under trade names, mention may here be made of examples such as "Dynacure SM 15" (Dynachem. Corp., USA) and "Solder-mask 1301" (Minnesota Mining & Manufacturing Co., USA).

The selection and composition of suitable adhesives of this kind for the method of the invention is within the scope of the knowledge of a specialist. For the method of the invention use is generally made of practically solvent-free preparations (for example containing less than 5% by weight of solvent), which consist predominantly of one or more component or components which can be irreversibly set rapidly, for example within less than 1 second, at room temperature (15°-30° C.) by actinic radiation, preferably by UV light of 200–500 nm, and which may if desired contain a customary photosensitiser. The preparation preferably has a consistency or viscosity suitable for application by screen printing.

For the purpose of forming the adhesion web 16 at least one of the cell wall elements is provided with a coating of the preparation in a region corresponding approximately to the adhesion web 16, preferably by screen printing, the total thickness of the coating being slightly greater than the desired thickness of the cavity 20 provided in the cell to receive the LC composition. For the purpose of forming the bridge contact 18 a corresponding region of the coating is permeated with metal powder, which can be achieved for example by using a mixture of the preparation containing from 5 to 25% of metal powder, for example Ag powder, and correspondingly applying this mixture in the desired region.

The cell wall elements can then if desired be joined together by using a corresponding frame in the manner illustrated in FIG. 2. After adjustment in the usual manner, for example with the aid of adjustment marks provided on each wall element, the wall elements are lightly pressed together and the adhesive is then at least partly irreversibly set by exposure to UV light.

The thickness of the cell cavity 20 can in the simplest case be controlled solely by means of the thickness of the layer of adhesive applied to the cell wall element or elements if the hardenable preparation has an adequately high viscosity. However, it is also possible to use spacer parts, for example in the form of fine glass pellets of identical diameter, for example 10 μm, corresponding to the desired final distance between the cell wall elements. The glass pellets can be mixed in amounts of for example 0.01 to 0.5% by weight with the preparation which can be irreversibly set by actinic radiation, before the preparation is applied.

Figure 3:
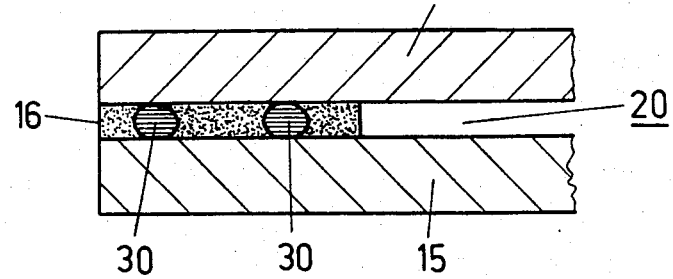
FIG. 3 is a section view on the line 3—3 in FIG. 1 on a larger scale.

As shown in FIG. 3, pellets 30 of this kind, lying in the adhesion web 16 between the plates 12, 15, constitute a very effective means of limiting the reduction of the thickness of the cell space brought about by the pressing of the plates against one another.

By exposure to actinic radiation, which preferably occurs abruptly, for example in the form of a flash, the preparation can be rapidly or abruptly hardened at room temperature, at least to such an extent that the cell can be handled without changing its geometry and for example can be subjected to after-hardening by actinic radiation and/or by the action of a moderate temperature, for example 30°-60° C.

The after-hardening is however not a critical step of the process of the invention, since with many preparations adequate irreversible setting can be achieved by a single exposure.

As mentioned above, the method of the invention permits a surprisingly simple solution of the problem of controlling the desired thickness of the cell cavity. This is illustrated diagrammatically in FIG. 4.

After a coating 43 of the preparation which can be irreversibly set by actinic radiation has been applied in the edge region of the cell wall elements 41, 42 which are to be adhesively bonded together (in the drawing thickness of this coating is exaggerated for the sake of greater clarity), the two cell wall elements 41, 42 are disposed in a frame 45 and supported from below by a perforated carrier plate 46. After the usual adjustment with the aid of a microscope (not shown) the element 42 serving as cover plate is subjected to plane parallel pressing against the element 41 with the aid of rams 401, 402. At the same time the distance between the elements 41, 42 is continuously measured with the aid of a device 47, for example an optical instrument for measuring distance by interference effects. When a prescribed distance is reached, the device 47 transmits through the lines 471, 472 a signal which initiates the actinic radiation produced by the radiation sources 481, 482. The resultant radiation can be produced abruptly ("flash") or for a longer duraton. Although two radiation sources are shown in the drawing, it is also possible to work with a single radiation source, for example a conventional electronic flash apparatus such as is used for photographic purposes, or with three or more radiation sources.

In any case, when the process is carried out in this manner, on reaching the prescribed distance, which may but need not be equal to the thickness of the cell cavity 44, actinic irradiation is effected with an intensity adequate for rapid and preferably abrupt hardening of the preparation in the region of the coating 43. For example 5-50 watts per square centimeter is normally adequate for this purpose. This irradiation is effected through the cell wall element facing the light source, that is to say in the case illustrated the plate 42. A certain absorption of raidation in the plate can without difficulty be compensated by selection of the parameters, including the nature and sensitivity of the irreversible setting preparation.

The rapid to abrupt increase of the viscosity of the preparation in the coating 43 in consequence of at least partial irreversible setting, which is initiated by exposure to actinic radiation, prevents any further advance of the rams 401, 402, which can be controlled either directly by means of a correspondingly weak feed power or indirectly through the variation of the rate of feed.

It is obvious that the number and nature of the devices guiding the cell wall elements towards one another can be varied within the scope of competance of the specialist. This also applies to the selection of those sides of the cell through which the continuous measurement of spacing and the exposure take place. The thickness of the coating 43 should in general not be so great that the uniformity of the irreversible setting initiated by actinic radiation suffers. Within the range of 5-30 µm, which is important for the industrial production of LC cells, no difficulties occur in this respect.

Figure 4:
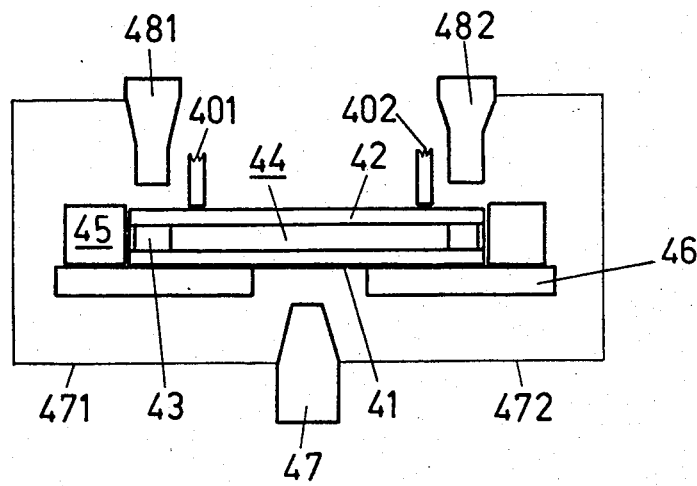
FIG. 4 is a schematical representation of an apparatus for applying the method of the invention.

After the distance between the cell wall elements has been fixed with the aid of a device of the kind shown in FIG. 4, further processing, including any after-hardening that may be desired, filling with LC composition, and sealing of the filling aperture, may follow.

As mentioned above, UV light of the wavelength indicated is preferred as actinic radiation, but light of other wavelength can also be used for the irreversible setting of suitable preparations if suitable sensitizers and a suitable intensity are used. Electron beams are also suitable as actinic radiation. For further details regarding the composition of the preparation which can be irreversibly set by actinic or UV radiation and the special conditions under which such preparations are expediently set, reference can additionally be made to literature in connection with screen printing for printed circuit boards. In general the use according to the invention of preparations or adhesives which can be irreversibly set by actinic rays for the production of LC cells offers the following advantages: setting is possible by UV light (ultraviolet light from an ultraviolet lamp or other light sources) within a time varying from a few seconds to a matter of minutes depending on the intensity of the radiation; no rise in temperature is required for the setting; the use of solvent-free adhesive lacquers is enabled; long life (pot life of preparations); the preparation can be satisfactorily screen printed and can be set through the cover glass; adequate resistance of the adhesion to liquid crystal substances and good adhesion to glass plates without special finish-pretreatment (UV setting preparation may contain cross-linking and adhesion promoters).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. In a method of producing cells for liquid crystal displays, consisting of two planar cell wall elements of which at least one is light-transmissive, said cell wall elements adhesively bonded in order to form between said cell wall elements a planar cell cavity suitable for receiving liquid crystal compositions, the improvement comprising:
    selecting an adhesive bonding made of a preparation which can be irreversibly set by actinic radiation,
    applying an adhesive web made of said adhesive bonding made of said preparation to at least one of said cell wall elements, said adhesion web applied to a thickness greater than a predetermined value for the thickness of said planar cell cavity,
    pushing said cell wall elements against one another,
    measuring continuously using optical measuring means the distance between said cell wall elements as said cell wall elements are pushed against one another, and
    polymerizing abruptly said adhesive bonding by exposing said bonding to actinic radiation when the measured value of thickness of said cell cavity equals said predetermined value of thickness, said polymerization resulting in practically no further reduction of said thickness of said cell cavity upon further pushing of said cell wall elements against one another.

2. In a method according to claim 1, the improvement of said step of exposing to actinic radiation further comprising:
    exposing said preparation by means of a light flash.

* * * * *